United States Patent
Benanti et al.

(10) Patent No.: US 9,505,967 B2
(45) Date of Patent: *Nov. 29, 2016

(54) WORKING FLUIDS COMPRISING FLUORINATED OLEFINS/FLUORINATED SATURATED HYDROCARBON BLENDS AND POLYOL ESTERS

(71) Applicant: Chemtura Corporation, Middlebury, CT (US)

(72) Inventors: Travis Benanti, Farmington, CT (US); Edward T Hessell, Fairfield, CT (US); Roberto Urrego, Newington, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,948

(22) Filed: Jul. 10, 2015

(65) Prior Publication Data

US 2016/0009974 A1    Jan. 14, 2016

Related U.S. Application Data

(60) Provisional application No. 62/024,002, filed on Jul. 14, 2014.

(51) Int. Cl.
*C09K 5/04* (2006.01)
*C10M 171/00* (2006.01)
*C10M 105/38* (2006.01)

(52) U.S. Cl.
CPC ............ *C09K 5/045* (2013.01); *C10M 105/38* (2013.01); *C10M 171/008* (2013.01); *C09K 2205/126* (2013.01); *C09K 2205/22* (2013.01); *C10M 2207/2835* (2013.01); *C10N 2220/027* (2013.01); *C10N 2220/028* (2013.01); *C10N 2220/302* (2013.01); *C10N 2230/06* (2013.01); *C10N 2240/30* (2013.01)

(58) Field of Classification Search
CPC .......... C10M 171/008; C10M 105/38; C10M 129/74
See application file for complete search history.

(56) References Cited

U.S. PATENT DOCUMENTS

| | | | |
|---|---|---|---|
| 5,964,581 A | 10/1999 | Iizuka et al. | |
| 6,267,906 B1 * | 7/2001 | Schnur | C09K 5/045 252/68 |
| 6,444,626 B1 | 9/2002 | McHenry et al. | |
| 8,318,647 B2 | 11/2012 | Carr et al. | |
| 8,603,354 B2 | 12/2013 | Kaneko | |
| 8,852,449 B2 * | 10/2014 | Carr | C10M 171/008 252/68 |
| 8,865,015 B2 * | 10/2014 | Carr | C10M 171/008 252/68 |
| 9,133,380 B2 * | 9/2015 | Benanti | C09K 5/045 |
| 2010/0190672 A1 * | 7/2010 | Carr | C10M 171/008 508/485 |
| 2012/0011864 A1 | 1/2012 | Lech et al. | |
| 2013/0096218 A1 | 4/2013 | Rached et al. | |
| 2013/0099154 A1 | 4/2013 | Boussand et al. | |
| 2013/0207023 A1 | 8/2013 | Benanti et al. | |
| 2014/0137578 A1 | 5/2014 | Yana Motta et al. | |

OTHER PUBLICATIONS

PCT International Search Report and Written Opinion dated Oct. 21, 2015 from corresponding Application No. PCT/US2015/039859, 10 pages.

* cited by examiner

*Primary Examiner* — John Hardee
(74) *Attorney, Agent, or Firm* — Dilworth IP LLC

(57) ABSTRACT

Working fluids comprising a refrigerant blend comprising a fluorinated alkane and a fluorinated olefin refrigerant, and a polyol ester lubricant composition comprising a mixture of alkylcarboxy esters of mono-pentaerythritol, di-pentaerythritol, tri-pentaerythritol and pentaerythritol oligomers, wherein at least 10 wt % of all polyol esters are esters of pentaerythritol oligomers of 4 or more pentaerythritol monomer groups.

11 Claims, No Drawings

WORKING FLUIDS COMPRISING FLUORINATED OLEFINS/FLUORINATED SATURATED HYDROCARBON BLENDS AND POLYOL ESTERS

This application claims benefit under 35 USC 119(e) of U.S. Prov. Appl. No. 62/024,002, filed Jul. 14, 2014, the disclosure of which is incorporated herein by reference.

Provided are working fluids comprising as refrigerant a blend of fluorinated olefin and a fluorinated saturated hydrocarbon wherein over 15 wt % of the refrigerant is fluorinated olefin, and a polyol ester lubricant comprising a mixture of alkylcarboxy esters of pentaerythritol, di-pentaerythritol, tri-pentaerythritol and pentaerythritol oligomers, the working fluid being an efficient alternative for heat transfer devices having a lower global warming potential than presently available commercial alternatives.

BACKGROUND

Heat transfer devices such as refrigerators, freezers, heat pumps and air conditioning systems are well known. In simple terms such devices typically operate via a cycle wherein a refrigerant of a suitable boiling point evaporates taking heat from its surroundings. After compression, the vapor passes to a condenser where it condenses to a liquid and gives off heat to its new surroundings, before returning to the evaporator via an expansion device and completing the cycle. In addition to the mechanical parts, such as a compressor etc., specially suited materials are needed, including refrigerant, suitable heat transfer materials, sealants to prevent loss of refrigerant, and lubricants to allow for functioning of the movable parts of the device. The lubricant in these devices must have good low temperature flow properties, be thermally stable, provide protection against wear of moving parts such as bearings under load, remove heat from the compressor and seal clearances to ensure efficient compression of gas from low to high pressure.

The refrigerant and the lubricating oil must circulate in the system without undergoing phase separation over a wide temperature range. Typically, the refrigerant and the lubricating oil have low temperature and high temperature regions where they undergo phase separation. Generally, the refrigerant and the lubricating oil undergo is expected to undergo phase separation in the low temperature region at temperatures below 0° C., e.g., −10° C., −20° C. and in some cases lower. Phase separation in high temperature region is expected to be above room temperature, e.g., 50° C., 60° C., or higher. If the phase separation of the refrigerant and the lubricating oil occurs, for example, in the compressor where temperatures are high, movable parts can be insufficiently lubricated, and damage due to baking or the like can lead to shortened lifetime of the device.

On the other hand, excessive miscibility can be problematic. For example, high concentrations of refrigerant in the lubricant can greatly reduce the viscosity of the lubricant, adversely impacting the ability of the lubricant to lubricate and protect parts of the heat transfer device, leading to increased wear, shortened lifetime and lower performance of the device. Dissolved refrigerant in the lubricant can also cause foaming and bubbling of the lubricant mixture as it flows from one area of the compressor to another (e.g., low to high temperature regions). Furthermore, refrigerant dissolved in the lubricant is essentially trapped and taken out of circulation, thereby reducing the capacity of the system.

As efficient functioning of a refrigeration lubricant requires not just proper lubricating properties and appropriate viscosities, but also appropriate compatibility with the refrigerant, changes in refrigerant frequently demand corresponding changes in lubricant.

EP 0 422 182 discloses lubricants prepared by the condensation of pentaerythritol and $C_{6-8}$ monocarboxylic acids that are almost fully miscible with highly or fully fluorinated hydrocarbons such as 1,1,1,2-tetrafluoroethane, commonly known as HFC-134a, difluoromethane (HFC-32), trifluoromethane (HFC-23), pentafluoroethane (HFC-125), 1,1,2, 2-tetrafluoroethane (HFC-134), 1,1,1-trifluoroethane (HFC-143a) and the like. Similar lubricants are also disclosed in U.S. Pat. No. 5,964,581.

US 2013/0207023 discloses working fluids for heat transfer devices comprising difluoromethane and a polyol ester lubricant composition having a kinematic viscosity at 40° C. of from about 32 to about 120 cSt comprising linear and branched $C_{5-10}$ alkylcarboxy esters of a mixture of neopentyl polyols, wherein at least 10 wt % of all neopentyl polyol esters are esters of pentaerythritol oligomers of 4 or more pentaerythritol monomer groups and a majority of the alkylcarboxy groups of the alkylcarboxy esters of neopentyl polyols are pentanoyl groups wherein 15 to 45% of the pentanoyl groups are branched.

U.S. Pat. No. 6,444,626 discloses lubricants comprising poly(pentaerythritol) esters which contain mixtures of pentaerythritol esters, di-pentaerythritol esters, tri-pentaerythritol esters and tetra- and higher oligomeric pentaerythritol esters, which are prepared via a two-step process from mono-pentaerythritol and carboxylic acids, wherein the mono-pentaerythritol is oligomerized during the process. U.S. Pat. No. 8,318,647 discloses refrigeration lubricants comprising select mixtures of carboxy esters of pentaerythritol, di-pentaerythritol and tri-pentaerythritol.

Concern about ozone depletion lead to the replacement of chlorofluorocarbon refrigerants with alternate materials, such as highly or fully fluorinated hydrocarbons, and concern about climate change is leading to replacement, at least in part, of the presently used fluorinated alkanes with fluorinated olefins, particularly hydrofluoro-olefin refrigerants, having a lower global warming potential (GWP). For example, whereas fluorinated alkane refrigerant R-410A has a GWP of 1725, fluorinate alkene, R-1234ze has a GWP of only 6 or less.

Ideally, hydrofluoro-olefin (HFO) refrigerants would serve as "drop-in" replacements for the presently used fluorinated alkanes in refrigeration working fluids. However, it is not uncommon with refrigeration working fluids that changes in the refrigerant, or the conditions under which the working fluid is used, require changes in the lubricant. Even though many hydrofluoro-olefins are structurally similar to commercial saturated hydrofluorocarbons (HFC), simple replacement of saturated hydrofluorocarbons with hydrofluoro-olefins in the existing lubricant compositions has presented a number of challenges. Mixtures of fluorinated olefins with fluorinated alkanes have been developed, as well as miscibility additives for use with fluorinated refrigerants such as hydrofluoro-olefins.

US 2013/0096218 discloses heat transfer compositions comprising mixtures of tetrafluoropropene, difluoromethane and tetrafluoroethane. US 2013/0092869 discloses a composition comprising polyol esters and a mixture of tetrafluoropropene, pentafluoropropene, and trifluoropropyne.

US 2012/0011864 discloses the use of perfluoropolyethers as additives to improve the characteristics of a wide variety of fluorinated refrigerants including hydrofluoro-olefins.

U.S. Pat. No. 8,603,354 discloses lubricating oil compositions for a refrigerator using as a refrigerant, a fluorine-containing organic compound containing a specific polar structure and having a low global warming potential. Exemplified refrigerants include fluorinated ketones, fluorinated ethers and fluorinated alcohols.

US 2013/0099154 discloses a composition comprising polyol esters and tetrafluoropropene, however only ISO 68 lubricants are exemplified.

The transition to lower global warming potential (GWP) refrigerants is critical to the realization of environmentally sustainable and more energy efficient refrigeration and other heat transfer technologies. Candidates to replace refrigerants R-22 and R-410A in air conditioning and heat pump applications include R-32 (difluoromethane) and hydrofluoro-alkane/hydrofluoro-olefin blends (HFC/HFO blends) with GWPs in the range of 400-650, e.g., blends containing 70% or more R-32 with hydrofluoro-olefin, such as L-41a & b (Honeywell) and DR-5 (DuPont).

Although lubricant is added to the system for lubricating the moving parts of the compressor, it also plays a thermofluidic role, impacting capacity and efficiency. For example, lubricants can influence capacity by altering heat transfer coefficients, lowering pressures necessary to reach operating temperatures, and increasing pressure drops. Lubricants also affect efficiency by changing the isoentropic efficiency of the compressor, which would raise or lower the discharge temperature for a given discharge pressure. Lubricants currently used commercially with refrigerants such as R-410A are not necessarily compatible R-32 and HFC/HFO blends under all conditions of use, causing concern over the possibility of inadequate lubrication, poor oil return, and excessive lubricant hold-up in the system.

For a variety of commercial, safety and ecological considerations, it would be desirable to have a working fluid comprising a blend of low GWP refrigerants for applications such as heat pumps and air conditioners for houses, air conditioners for cars and other heat transfer devices, designed to balance cost, flammability and performance. As in other working fluids containing fluorinated refrigerants, the lubricant must exhibit appropriate miscibility with the refrigerant while maintaining a suitable functioning viscosity for the lubricant/refrigerant mixture.

It has been found that working fluids currently used in heat transfer devices can be replaced without loss of operational efficiency with working fluids comprising low GWP refrigerant blends and lubricants having a higher viscosity than presently specified. For example, fluids comprising R-410A and a traditional polyol ester lubricant with an ISO viscosity of 32 can be replaced in heat transfer devices by working fluids of the invention comprising a low GWP refrigerant blend and a lubricant having an ISO grade viscosity of, e.g., 46, 68 or 100 with no loss of operational efficiency. In addition to lower GWP, good lubricant/refrigerant miscibility, excellent lubrication and a high level of wear protection, the proper pairing of lubricant and refrigerant pairing in the inventive working fluid also provides overall heat transfer efficiency improvements.

SUMMARY OF THE INVENTION

This invention provides a working fluid suitable for heat transfer devices, comprising a refrigerant and a polyol ester lubricant, wherein said refrigerant comprises over 15% by weight of a fluorinated olefin, for example, a refrigerant comprising from 20 to 40% by weight, based on the total weight of the refrigerant, of a fluorinated olefin e.g., a hydrofluoro-alkene, and from 60 to 80% by weight of a fluorinated saturated hydrocarbon, e.g., a hydrofluoro-alkane, and wherein said polyol ester lubricant has a kinematic viscosity at 40° C. of from 32 to 120 cSt, e.g., 32 to 100 cSt or 40 to 100 cSt and comprises a mixture of $C_{5-10}$ alkylcarboxy esters of pentaerythritol, di-pentaerythritol, tri-pentaerythritol and oligomers comprising 4 or more pentaerythritol monomers, wherein 60 mole % or more of all the $C_{5-10}$ alkylcarboxy groups of the polyol esters are linear or branched $C_5$ alkylcarboxy groups, and 20-60% of all $C_{5-10}$ alkylcarboxy groups in the polyol ester lubricant are branched.

The lubricant composition of the invention is ideally suited for use with refrigeration blends comprising fluoroalkenes and fluoro-alkanes, e.g., blends of hydrofluoro-olefin refrigerants such as R-1234ze (1,3,3,3-tetrafluoropropene) and of hydrofluoro-alkane refrigerants such as R-32 (difluoromethane).

The lubricant/low-GWP refrigerant blends of the invention exhibit excellent miscibility over a wide range of operating conditions, which has been found to improve overall performance of the heat transfer device. Given the strong lubricant diluting effect associated with fluorinated refrigerants, particularly fluorinated olefins, the viscosity of the working fluid under operating conditions, rather than the viscosity of the lubricant alone, is an important factor in the long term performance of the device. It has been found that when combined with the present refrigerant blends, lubricants of the invention with higher viscosity than normally specified for a particular device are often an excellent choice for producing a low GWP working fluid replacement for many commercial heat transfer devices that are currently using standard halogenated refrigerants and lower viscosity lubricants. The working fluids of the invention also maintain acceptable viscosity with good film building and load bearing properties, while in many instances providing improved lubricity and wear protection under challenging conditions.

DESCRIPTION OF THE INVENTION

One embodiment of the invention provides a working fluid comprising:
i) a refrigerant blend comprising from 20 to 40% by weight, based on the weight of the refrigerant blend, of a hydrofluoro-olefin, such as R-1234ze (1,3,3,3-tetrafluoropropene), and from 60 to 80% by weight, based on the weight of the refrigerant blend, of a hydrofluoro-alkane refrigerant, such as R-32 (difluoromethane),
and
ii) a polyol ester lubricant composition having a kinematic viscosity at 40° C. of from 32 to 120 cSt, typically from 32 to 100 cSt, and often from 40 to 100 cSt, comprising a mixture of $C_{5-10}$ alkylcarboxy esters of pentaerythritol, di-pentaerythritol, tri-pentaerythritol and oligomers comprising 4 or more pentaerythritol monomers, wherein at least 10 wt % of all polyol esters are esters of oligomers containing 4 or more pentaerythritol polyol monomer units, wherein 60 mole %, e.g., 75 mol % or more, or more of all the $C_{5-10}$ alkylcarboxy esters are linear or branched $C_5$ alkylcarboxy esters, and 20-60% of all $C_{5-10}$ alkylcarboxy groups of the polyol esters are branched.

In some embodiments, 80 mole %, 85 mole % or more of all $C_{5-10}$ alkylcarboxy esters are linear or branched $C_5$ alkylcarboxy esters, and in some embodiments 90 mol % or more of all $C_{5-10}$ alkylcarboxy esters are linear or branched $C_5$ alkylcarboxy esters.

In typical embodiments the polyol ester lubricant composition comprises:
a) from about 30 to about 85 wt % $C_{5-10}$ alkylcarboxy esters of pentaerythritol,
b) from about 1 to about 20 wt % $C_{5-10}$ alkylcarboxy esters of di-pentaerythritol,
c) from about 1 to about 10 wt % $C_{5-10}$ alkylcarboxy esters of tri-pentaerythritol, and
d) from about 10 to about 45 wt % $C_{5-10}$ alkylcarboxy esters of pentaerythritol oligomers of 4 or more pentaerythritol monomer groups;
for example:
a) from about 30 to about 55 wt % $C_{5-10}$ alkylcarboxy esters of pentaerythritol,
b) from about 1 to about 20 wt % $C_{5-10}$ alkylcarboxy esters of di-pentaerythritol,
c) from about 1 to about 10 wt % $C_{5-10}$ alkylcarboxy esters of tri pentaerythritol, and
d) from about 25 to about 45 wt % $C_{5-10}$ alkylcarboxy esters of pentaerythritol oligomers of 4 or more pentaerythritol monomer groups,
wherein the wt % is based on the weight of all polyol esters in the lubricant.

In most embodiments 70 mol % or more, e.g., 75 mol % or more of all $C_{5-10}$ alkylcarboxy esters are linear or branched $C_5$ alkylcarboxy esters and 20-60% of all $C_{5-10}$ alkylcarboxy groups in the lubricant are branched, often 25 to 55% are branched and in certain embodiments 30 to 50% or 30 to 45 mol % of all $C_{5-10}$ alkylcarboxy groups in the lubricant are branched.

In addition to the $C_5$ alkylcarboxy esters, linear or branched $C_6$, $C_7$, $C_8$, $C_9$ and/or $C_{10}$ alkylcarboxy esters will also typically be present. In certain embodiments linear $C_7$, $C_8$, $C_9$ and/or $C_{10}$ alkylcarboxy esters, and branched $C_8$ and/or $C_9$ alkylcarboxy esters are present, for example, the lubricant will often comprise linear and branched $C_5$ alkylcarboxy esters, one or more linear $C_7$, $C_8$, $C_{10}$ alkylcarboxy esters, and/or branched $C_9$ alkylcarboxy esters such as 3,5,5-trimethylhexanoyl.

For example, the lubricant comprises from 60 to 99, 70 to 95, or 75 to 95 mol % of a mixture of $C_5$ alkylcarboxy esters; from 0 to 25 mol %, e.g., 1 to 25 mol % branched $C_9$ alkylcarboxy esters; and from 0 to 10 mol % linear $C_7$ alkylcarboxy esters of pentaerythritol, di-pentaerythritol, tri-pentaerythritol and pentaerythritol oligomers of 4 or more pentaerythritol monomer groups. For example, typically the polyol lubricants comprise 75 to 95 mol % of a mixture of $C_5$ alkylcarboxy esters; from 1 to 15 mol % branched $C_9$ alkylcarboxy esters; and from 1 to 10 mol % linear $C_7$ alkylcarboxy esters.

Good results have been obtained when 30 to 45 mol % of all $C_{5-10}$ alkylcarboxy groups in the lubricant are branched, 85 to 95 mol % of all $C_{5-10}$ alkylcarboxy esters are $C_5$ alkylcarboxy esters and at least 30 45 mol % of $C_5$ alkylcarboxy groups are branched.

The alkylcarboxy groups of the inventive polyol ester lubricant are mono-carboxylates, and less than 5 mol %, typically less than 2 mol %, and often none of the carboxylates are derived from di- or poly-carboxylic acids.

The present lubricants, depending on the device in which they are to be used, typically have a kinematic viscosity at 40° C. of at least 32 cSt, 40 cSt, 46 cSt, 60 cSt or higher, and may be as high as 80 cSt, 100 cSt or 120 cSt, but higher viscosities may be contemplated. In many embodiments, the viscosity of the lubricant at 40° C. will be from 40 to 120 cSt, 40 to 100 cSt, 46 to 100 cSt, or from 48 to 80 cSt.

It is also common for the lubricant of the invention to have a kinematic viscosity at 100° C. of from 5 to 20 cSt, e.g., from 6 to 15 cSt, and often from 7 to 14 cSt.

The mixture of polyol esters of the present lubricant may be prepared by simple esterification of the appropriate pentaerythritol, dipentaerythritol, and poly(pentaerythritol)s, however this requires obtaining the individual polyols as starting materials. The polyol ester composition is more conveniently prepared by a two-step process analogous to that of, e.g., U.S. Pat. Nos. 3,670,013 and 6,444,626; 8,318,647.

Other lubricants may be present in the working fluid, such as other polyol esters, polyalphaolefins, polyalkylene glycols, alkylated aromatics, polyethers, mineral oils, phosphoric acid ester, other ester based lubricants, vegetable oils etc., however, the polyol ester composition defined above is the majority lubricant component of the lubricant composition, typically comprising at least 70, 80, 90, 95, or 98 wt % of the lubricant base stock, often at least 90, 95, or 98 wt %, and in many embodiments, the polyol ester composition described above is the only lubricant in the inventive working fluid. Care must be used when adding other lubricant base stocks so that the desirable properties of the polyol ester composition relative to its use with hydrofluoro olefins are not diminished.

The refrigerant blends and lubricants of the invention are miscible throughout the operating range of most heat transfer devices. For example, when the refrigerant of the working fluid is a blend comprising from 20 to 35% R-1234ze and from 80 to 65% R-32, e.g., approximately 27% R-1234ze and approximately 73% R-32, phase separation of the working fluid at a concentration of 10% oil in the refrigerant occurs below 0° C. at the low temperature side, typically from −1° C. to −50° C., and in some embodiments from −5° C. to −50° C., e.g., from −5 to −25° C., and in particular embodiments from −10 to −20° C. Phase separation at the high temperature side typically occurs at temperatures of 60° C. or higher.

The viscosity of the polyol ester lubricant in the presence of the refrigerant under the conditions of use is of high concern, but this may be depressed by the amount of refrigerant dissolved therein. Working fluids with acceptable working viscosity can be readily obtained by combining the polyol esters and the fluorinated olefin refrigerant blend of the invention along with any additives typically found in the art. Given the strong lubricant diluting effect associated with fluorinated refrigerants, e.g., fluorinated olefins, the ability of the present working fluids comprising low GWP refrigerants to maintain superior working viscosities under strenuous conditions is a major step forward in refrigeration technology. Generally the working fluid of the invention will function well in systems requiring, for example, lubricants with ISO viscosity grades of 32, 46, 84, 80, or 100.

The refrigerant blends of the invention comprise by weight, based on all refrigerants in the blend, between 15 and 50% of a fluorinated-olefin and from 50 to 85% of a fluorinated-alkane, for example, from 20 to 40% of fluorinated-olefin and from 60 to 80% of fluorinated-alkane, or from 20 to 35% fluorinated-olefin and from 80 to 65% fluorinated-alkane.

The refrigerant blend the invention generally comprises a fluorinated olefin, e.g., a hydrofluorinated olefin of from 2 to 7 carbon atoms, typically 3, 4 or 5 carbons, and more than one may be present. In many embodiments the fluorinated olefin comprises a fluorinated propene. It is also possible for a perfluorinated olefin to also be present.

In some embodiments, small amounts, e.g., less than 10 wt %, typically less than 5 wt %, of other refrigerants such as alkanes, alkenes, $CO_2$ etc., may be present, but in most embodiments the refrigerant consists of a mixture of fluorinated-olefin and fluorinated alkane.

In particular embodiments the refrigerant blend comprises from 25 to 30% of a fluorinated-olefin, for example, a polyfluorinated ethene or propene such as R-1234ze or R-1234yf, and from 70 to 75% of a fluorinated-alkane, for example, a polyfluorinated methane, ethane or propane, such as R-32. In the present application, the pronoun "a" or "an" means one or more than one.

Many fluorinated olefin refrigerants of the invention are known in the art, e.g., US 2012/0011864, and include E and Z isomers of, e.g.:
1,2,3,3,3-pentafluoro-1-propene; 1,1,3,3,3-pentafluoro-1-propene; 1,1,2,3,3-pentafluoro-1-propene; 1,2,3,3-tetrafluoro-1-propene; 2,3,3,3-tetrafluoro-1-propene; 1,3,3,3-tetrafluoro-1-propene; 1,1,2,3-tetrafluoro-1-propene; 1,1,3,3-tetrafluoro-1-propene; 1,2,3,3-tetrafluoro-1-propene; 3,3,3-trifluoro-1-propene; 2,3,3-trifluoro-1-propene; 1,1,2-trifluoro-1-propene; 1,2,3-trifluoro-1-propene; 1,1,3-trifluoro-1-propene; 1,3,3-trifluoro-1-propene;
1,1,1,2,4,4,4-heptafluoro-2-butene; 1,2,3,3,4,4,4-heptafluoro-1-butene; 1,1,1,2,3,4,4-heptafluoro-2-butene; 1,1,3,3,4,4,4-heptafluoro-1-butene; 1,1,2,3,4,4,4-heptafluoro-1-butene; 1,1,2,3,3,4,4-heptafluoro-1-butene; 2,3,3,4,4,4-hexafluoro-1-butene; 1,3,3,4,4,4-hexafluoro-1-butene; 1,2,3,4,4,4-hexafluoro-1-butene; 1,2,3,3,4,4-hexafluoro-1-butene; 1,1,2,3,4,4-hexafluoro-2-butene; 1,1,1,2,3,4-hexafluoro-2-butene; 1,1,1,2,4,4-hexafluoro-2-butene; 1,1,3,4,4-hexafluoro-2-butene; 1,1,2,3,3,4-hexafluoro-1-butene; 1,1,2,3,4,4-hexafluoro-1-butene; 1,1,1,2,4-pentafluoro-2-butene; 1,1,1,3,4-pentafluoro-2-butene; 3,3,4,4,4-pentafluoro-1-butene; 1,1,1,4,4-pentafluoro-2-butene; 1,1,1,2,3-pentafluoro-2-butene; 2,3,3,4,4-pentafluoro-1-butene; 1,1,2,4,4-pentafluoro-2-butene; 1,1,2,3,3-pentafluoro-1-butene; 1,1,2,3,4-pentafluoro-2-butene; 2,3,4,4,4-pentafluoro-1-butene; 1,2,4,4,4-pentafluoro-1-butene; 1,3,4,4,4-pentafluoro-1-butene; 1,3,3,4,4-pentafluoro-1-butene; 1,2,3,4,4-pentafluoro-1-butene; 3,3,4,4-tetrafluoro-1-butene; 1,1,1,2-tetrafluoro-2-butene; 1,1,1,3-tetrafluoro-2-butene;
3,3,3-trifluoro-2-(trifluoromethyl)-1-propene; 1,1-difluoro-2-(difluoromethyl)-1-propene; 1,3,3,3-tetrafluoro-2-methyl-1-propene; 3,3-difluoro-2-(difluoromethyl)-1-propene; 1,1,3,3,3-pentafluoro-2-methyl-1-propene; 2-(difluoromethyl)-3,3,3-trifluoro-1-propene; 1,3,3,3-tetrafluoro-2-(trifluoromethyl)-1-propene;
1,1,1,2,4,4,5,5,5-nonafluoro-2-pentene; 1,1,1,3,4,4,5,5,5-nonafluoro-2-pentene; 1,2,3,3,4,4,5,5,5-nonafluoro-1-pentene; 1,1,3,3,4,4,5,5,5-nonafluoro-1-pentene; 1,1,2,3,3,4,4,5,5-nonafluoro-1-pentene; 1,1,2,3,4,4,5,5,5-nonafluoro-2-pentene; 1,1,1,2,3,4,4,5,5-nonafluoro-2-pentene; 1,1,1,2,3,4,5,5,5-nonafluoro-2-pentene; 2,3,3,4,4,5,5,5-octafluoro-1-pentene; 1,2,3,3,4,4,5,5-octafluoro-1-pentene; 3,3,4,4,5,5,5-heptafluoro-1-pentene; 2,3,3,4,4,5,5-heptafluoro-1-pentene; 1,1,3,3,5,5,5-heptafluoro-1-pentene; 3,4,4,5,5,5-hexafluoro-2-pentene; 3,3,4,5,5,5-hexafluoro-1-pentene;
1,1,1,4,4,4-hexafluoro-2-(trifluoromethyl)-2-butene; 1,2,3,4,4,4-hexafluoro-3-(trifluoromethyl)-1-butene; 1,1,2,4,4,4-hexafluoro-3-(trifluoromethyl)-1-butene; 1,1,1,4,4,4-hexafluoro-2-(trifluoromethyl)-2-butene; 1,1,3,4,4,4-hexafluoro-3-(trifluoromethyl)-1-butene; 3,3,4,4,4-pentafluoro-2-(trifluoromethyl)-1-butene; 1,1,4,4,4-pentafluoro-3-(trifluoromethyl)-1-butene; 1,3,4,4,4-pentafluoro-3-(trifluoromethyl)-1-butene; 1,1,4,4,4-pentafluoro-2-(trifluoromethyl)-1-butene; 3,4,4,4-tetrafluoro-3-(trifluoromethyl)-1-butene; 1,1,1,2,4,4,4-heptafluoro-3-methyl-2-butene; 2,4,4,4-tetrafluoro-3-(trifluoromethyl)-1-butene; 1,4,4,4-tetrafluoro-3-(trifluoromethyl)-1-butene; 1,1,1,4-tetrafluoro-2-(trifluoromethyl)-2-butene; 1,1,1,3-tetrafluoro-2-(trifluoromethyl)-2-butene; 1,1,1-trifluoro-2-(trifluoromethyl)-2-butene; 1,1,1,4,4-hexafluoro-2-methyl-2-butene; 4,4,4-trifluoro-2-(trifluoromethyl)-1-butene;
3,3,4,4,5,5,6,6,6-nonafluoro-1-hexene; 3,4,4,5,5,6,6,6-octafluoro-2-hexene; 3,3,4,4,5,5,6,6-octafluoro-1-hexene; 4,4,5,5,6,6,6-heptafluoro-2-hexene; 4,4,5,5,6,6,6-heptafluoro-1-hexene; 1,1,1,2,2,3,4-heptafluoro-3-hexene;
1,1,1,3,4,5,5,5-octafluoro-2-(trifluoromethyl)-2-pentene; 1,1,1,3,4,5,5,5-octafluoro-4-(trifluoromethyl)-2-pentene; 4,4,4-trifluoro-3,3-bis(trifluoromethyl)-1-butene; 1,1,1,4,4,4-hexafluoro-3-methyl-2-(trifluoromethyl)-2-butene; 2,3,3,5,5,5-hexafluoro-4-(trifluoromethyl)-1-pentene; 1,1,1,2,4,4,5,5,5-nonafluoro-3-methyl-2-pentene; 1,1,1,5,5,5-hexafluoro-4-(trifluoromethyl)-2-pentene; 1,1,1,4,4-pentafluoro-2-(trifluoromethyl)-2-pentene; 4,5,5,5-pentafluoro-2-(trifluoromethyl)-1-pentene; 3,3,4,4,5,5,5-heptafluoro-2-methyl-1-pentene;
4,5,5,5-tetrafluoro-4-(trifluoromethyl)-1-pentene; 1,1,1,2,5,5,5-heptafluoro-4-methyl-2-pentene;
1,1,1,3-tetrafluoro-2-(trifluoromethyl)-2-pentene; and the like;
perfluorinated olefins that may optionally be present include: 1,1,1,2,3,4,4,4-octafluoro-2-butene; 1,1,2,3,3,4,4,4-octafluoro-1-butene, 1,1,1,2,3,4,4,5,5,5-decafluoro-2-pentene; 1,1,2,3,3,4,4,5,5,5-decafluoro-1-pentene; 1,1,2,3,3,4,4,5,5,6,6,6-dodecafluoro-1-hexene; 1,1,1,2,2,3,4,5,5,6,6,6-dodecafluoro-3-hexene; 1,1,1,4,4,4-hexafluoro-2,3-bis(trifluoromethyl)-2-butene; 1,1,1,2,3,4,5,5,5-nonafluoro-4-(trifluoromethyl)-2-pentene; and the like.

For example, in many embodiments the refrigerant blend comprises a pentafluoropropene, a tetrafluoropropene, or a trifluoropropene.

The fluorinated alkane refrigerants of the invention are also well known in the art and are typically polyfluorinated $C_{1-6}$ alkanes, including, for example, carbon tetrafluoride (R-14), difluoromethane (R-32), 1,1,1,2-tetrafluoroethane (R-134a), 1,1,2,2-tetrafluoroethane (R-134), pentafluoroethane (R-125), 1,1,1-trifluoroethane (R-143a) and the like, and more than one may be present.

Various refrigerant blends comprising over 20% fluorinated olefin refrigerants and fluorinated alkanes are known in the art, many of which are commercially available, and can be useful in the present invention.

One exemplary embodiment of the invention provides a low GWP working fluid having excellent lubrication properties, anti-wear activity, and heat transfer efficiency, capable of replacing a commercially accepted higher GWP fluid in air conditioner or heat pump applications. To do so, the low GWP working fluid of the invention must perform as well as, or better than, the commercially accepted fluid in terms of reducing friction, preventing wear of compressor parts, and efficiency as a heat transfer medium.

To this end, the properties of lubricants and working fluids of the invention were compared to commercial standards and other comparative formulations. Tests were run to measure properties of the lubricants themselves, e.g., load bearing and friction reduction properties, and properties of the working fluid comprising the lubricants and refrigerants, e.g., working viscosity and heat transfer efficiency. Details regarding the lubricant compositions, working fluid compositions, testing and data are found in the Examples.

The following discussion compares results obtained using a commercial ISO 32 polyol ester lubricant comprising esters of mono- and di-pentaerythritol, i.e., Comp A, a comparative ISO 68 polyol ester lubricant comprising esters of mono- and di-pentaerythritol, i.e., Comp C, and an ISO 68 polyol ester lubricant of the invention comprising esters of mono-, di-, tri-, tetra-pentaerythritol and other higher pentaerythritol oligomers, i.e., Inv 2, and from working fluids obtained by combining each of these lubricants with refrigerant R-410A, a blend comprising a 50:50 wt ratio of hydrofluoro alkanes R-32 and R-125, or refrigerant L-41b, a low GWP refrigerant blend according to the invention comprising a 73:27 wt ratio of hydrofluoro alkane R-32 to hydrofluoro olefin R-1234ze.

The lubricant Comp A was designed for HFC refrigerants and is an example of an optimized lubricant in terms of load carrying properties, lubricity and miscibility with select refrigerants. A working fluid comprising the lubricant of Comp A with the refrigerant R-410A is a commercially used, state of the art pairing of lubricant and refrigerant used, for example, in home air conditioners.

One aspect of the testing evaluated working fluids for use in heat transfer devices using full system testing under AHRI Standard 210/240 conditions. Two independent energy balances were used for calculating capacity: (1) air-side energy balance and (2) refrigerant-side energy balance. Combining measurements of air flow rate, temperature, and humidity change allowed the calculation of capacity. The change in specific enthalpy from component inlet to outlet was determined from temperature and pressure measurements. Power to the outdoor unit of an air conditioner was considered to be consumed by the compressor and a blower; power to the indoor unit was considered to be consumed by a fan and transformer. Each unit's power requirements were measured separately by calibrated transducers.

As stated above, selection of the proper lubricant/refrigerant pairing for the working fluid can provide overall heat transfer efficiency improvements. COP, coefficient of performance, measures system efficiency by relating the cooling capacity of an air conditioner to the power requirements of the system. It is a ratio of the amount of heat transferred, i.e., BTU of cooling effect produced, per unit of energy consumed, i.e., BTU of electricity used by compressors and fans to produce the effect. COP for various comparative working fluids and working fluids of the invention were calculated using standard techniques and showed that selection of the proper lubricant and refrigerant of the present invention can lead to efficiency improvements of up to ~12%.

A correlation was also observed regarding the effect of lubricant and refrigerant selection efficiency. For example, lubricant/refrigerant parings that were miscible over the full range of operating conditions outperformed those with miscibility gaps, i.e., lubricants that are not adequately miscible with the refrigerant over the whole range of operating conditions. These results confirm that miscibility of refrigerant and lubricant is an important component related to heat transfer efficiency.

The table below shows the miscibility of refrigerant with various concentrations of the selected lubricants at the low temperature region of the working fluid, that is, the temperatures shown are the point above which the lubricant/refrigerant pairing is miscible but below which the lubricant and refrigerant separate.

| Test Fluid | ISO Grade | Low End Misc Limit (° C.) @ % Oil | | | |
|---|---|---|---|---|---|
| | | 5% | 10% | 20% | 30% |
| Comp A R-410A | 32 | −40 | −26 | −22 | −22 |
| Comp A L-41b | 32 | −30 | −21 | −15 | −20 |
| Comp C L-41b | 68 | −20 | −8 | 5 | 4 |
| Inv 2 L-41b | 68 | −35 | −25 | −9 | −23 |

As one would expect, the commercial pairing of Comp A with R-410A shows good miscibility at temperatures below 0° C. Good low end miscibility is also seen with the parings of Comp A with L-41 b, and the inventive combination of Inv 2 with L-41 b, while the combination Comp C and L-41b is not sufficiently miscible in this temperature region.

Regarding lubricant performance in heat transfer devices, compressors are designed to operate under steady state conditions of fluid film lubrication, in which the moving parts are separated by a protective hydraulically generated barrier of lubricant. Such a film is a function of lubricant viscosity, the relative speed between the moving parts, surface roughness and the contact geometry of the parts. However, for a portion of their operating time compressors will operate under harsh boundary lubrication conditions (i.e., in a state where the load is sufficient to result in metal-metal contact of frictional surfaces). Boundary lubrication conditions are most often observed during start up and shut down, as well as small periods of time when the compressor operates at the fringe or outside the prescribed operating window. Without proper boundary lubrication, compressors can undergo catastrophic failure under these conditions after just a few seconds.

The lubricity of a lubricant can be considered as a separate property apart from load carrying performance. It is a property more related to the amount of frictional energy loss due to lubrication of parts under normal operation in either mixed film lubrication (where only the asperities on the surface of the metals are in partial contact) as well as the energy required to physically move the lubricant past itself (termed viscous drag) under fluid film lubrication, that is lubricity is more related to frictional energy losses rather than the potential wear resulting from high load.

The ability of the lubricant of the invention to reduce friction and prevent wear under conditions of boundary lubrication was estimated using the Falex Pin and Vee Block test, wherein the higher the reported failure load, the better the lubricant is predicted to prevent wear; even when all fluid film lubrication has ceased.

The lubricating properties related to lubricity of the POE lubricants was evaluated in the absence of refrigerant using the Mini Traction Machine, which is used to gather information related to the frictional properties of the lubricants under conditions of mixed film and fluid film (hydrodynamic) lubrication by measuring the coefficient of friction at various entrainment speeds. At very low entrainment speeds there is some direct metal-to-metal asperity contact (near boundary lubrication conditions), but as the entrainment speed increases there is a pressure buildup between the contacting surfaces due to increasing oil suction into the contact inlet resulting in a progression from near boundary, to mixed film, to complete fluid film (hydrodynamic) lubrication. Under conditions of near boundary and mixed film lubrication the high pressure in the contact produces local elastic flattening of the surfaces and increases the viscosity of the lubricant. In such contacts, C of F is determined by the molecular structure of the lubricant and contact temperature.

Results from Falex Pin and Vee Block testing, i.e., failure load, and Mini-Traction testing, i.e., C of F @ 40° C., are shown in the table below.

| Lubricant | Failure Load lbs. force at pin failure | C of F@ 40° C. 30 mm/s | 300 mm/s |
|---|---|---|---|
| Comp A | 950 | 0.57 | 0.45 |
| Comp C | 745 | — | — |
| Inv 2 | 890 | 0.57 | 0.48 |

The commercial lubricant Comp A and the lubricant Inv 2 show similar load carrying and lubricity characteristics.

Determining the load bearing and lubricity performance of a lubricant on its own can only offer preliminary guidance as to whether lubricant might perform well in the presence of a refrigerant as part of a working fluid under operating conditions encountered of a device. The working viscosities of working fluids comprising the lubricants and refrigerants of the preceding table were obtained in a heat transfer system operating in cooling mode under AHRI standard conditions A, B and C, shown below for compositions using refrigerant L-41b.

| AHRI Cond, Refrigerant L-41b | Compressor Inlet Temp (° C.) | Pressure (bar) | Compressor Outlet Temp ° C. | Pressure (bar) |
|---|---|---|---|---|
| A | 23.3 | 8.9 | 94.5 | 26.4 |
| B | 21.1 | 8.8 | 79.9 | 22.0 |
| C | 18.5 | 7.8 | 82.2 | 21.4 |

A low GWP working fluid replacement for the commercial blend Comp A/R-410a should have a working viscosity equal to or greater than that seen for the Comp A/R-410a blend under each AHRI Condition A, B and C. The data is shown below, calculations are based on appropriately measured compressor inlet/compressor outlet conditions:

| Test Fluid | ISO Grade | Working Fluid Viscosity (cSt) @ AHRI Cond | | |
|---|---|---|---|---|
| | | A | B | C |
| Comp A R-410a | 32 | 6.1 | 7.3 | 7.4 |
| Comp A L-41b | 32 | 4.4 | 5.7 | 5.7 |
| Comp C L-41b | 68 | 7.2 | 9.7 | 9.7 |
| Inv 2 L-41b | 68 | 7.0 | 9.2 | 9.3 |

Replacing refrigerant R-410a in the commercial blend with low GWP refrigerant L-41 b results in a working fluid with a lower working viscosity than the commercial standard under each test condition. On the other hand the working viscosities of the blends comprising R-41 b with lubricant Comp C or Inv2 are each greater than the viscosity of the commercial standard. However, as shown above, the lubricant of Comp C is not sufficiently miscible with R-41 b to be useful in a heat transfer device.

In this particular example, a working fluid of the invention comprising a low-GWP refrigerant blend, R-41 b, and a lubricant of the invention, Inv 2, with a higher viscosity than that used in the commercially accepted working fluid is an excellent replacement for the presently used commercial fluid.

In many embodiments the working fluids of the invention will often contain one or more additives common in the field including antioxidants, extreme-pressure additives, antiwear additives, friction reducing additives, defoaming agents, profoaming agents, metal deactivators, acid scavengers and the like.

Examples of antioxidants that can be used include phenolic antioxidants such as 2,6-di-t-butyl-4-methylphenol and 4,4'-methylenebis(2,6-di-t-butylphenol); amine antioxidants such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine, and alkylphenyl-2-naphthylamine; sulfur-containing antioxidants such as alkyl disulfide, thiodipropionic acid esters and benzothiazole; and zinc dialkyl dithiophosphate and zinc diaryl dithiophosphate.

Examples of extreme-pressure additives, antiwear additives, friction reducing additives that can be used include zinc compounds such as zinc dialkyl dithiophosphate and zinc diaryl dithiophosphate; sulfur compounds such as thiodipropionic acid esters, dialkyl sulfide, dibenzyl sulfide, dialkyl polysulfide, alkylmercaptan, dibenzothiophene and 2,2'-dithiobis(benzothiazole); sulfur/nitrogen ashless antiwear additives such as dialkyldimercaptothiadiazoles and methylenebis(N,N-dialkyldithiocarbamates); phosphorus compounds such as triaryl phosphates such as tricresyl phosphate and trialkyl phosphates; dialkyl or diaryl phosphates; trialkyl or triaryl phosphites; amine salts of alkyl and dialkylphosphoric acid esters such as the dodecylamine salt of dimethylphosphoric acid ester; dialkyl or diaryl phosphites; monoalkyl or monoaryl phosphites; fluorine compounds such as perfluoroalkyl polyethers, trifluorochloroethylene polymers and graphite fluoride; silicon compounds such as a fatty acid-modified silicone; molybdenum disulfide, graphite, and the like. Examples of organic friction modifiers include long chain fatty amines and glycerol esters.

Examples of defoaming and profoaming agents that can be used include silicone oils such as dimethylpolysiloxane and organosilicates such as diethyl silicate. Examples of the metal deactivators that can be used include benzotriazole, tolyltriazole, alizarin, quinizarin and mercaptobenzothiazole. Furthermore, epoxy compounds such as phenyl glycidyl ethers, alkyl glycidyl ethers, alkylglycidyl esters, epoxystearic acid esters and epoxidized vegetable oil, organotin compounds and boron compounds may be added as acid scavengers or stabilizers.

Examples of moisture scavengers include trialkylorthoformates such as trimethylorthoformate and triethylorthoformate, ketals such as 1,3-dioxacyclopentane, and amino ketals such as 2,2-dialkyloxazolidines.

The working fluids comprising the present polyol esters and refrigerant can be used in a wide variety of refrigeration and heat energy transfer applications. Examples include air conditioning equipment such as small window air conditioners, centralized home air conditioning units, light industrial air conditioners and large industrial units for factories, office buildings, apartment buildings and warehouses; refrigeration applications include home refrigerators, freezers, water coolers, vending machines and icemakers, large scale refrigerated warehouses and ice skating rinks. Also included in industrial applications are cascade grocery store refrigeration and freezer systems. Heat energy transfer applications include heat pumps for house hold heating and hot water heaters. Transportation related applications include automotive and truck air conditioning, refrigerated semi-trailers as well as refrigerated marine and rail shipping containers.

Compressors useful for these applications can be classified into two broad categories; positive displacement and dynamic compressors. Positive displacement compressors increase refrigerant vapor pressure by reducing the volume of the compression chamber through work applied to the compressor's mechanism. Positive displacement compressors include as reciprocating, rotary (rolling piston, rotary vane, single screw, twin screw), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

EXAMPLES

Lubricants

Table L1 lists the ISO viscosity grade, polyol component and the relative carboxylate amounts of three comparative lubricants, Comp A, Comp B and Comp C, and two lubricants of the invention, Inv 1 and Inv 2. "PolyPE" represents a composition that comprises the ratio of mono- to di- to tri- and higher pentaerythritol esters as reported for the invention above, the carboxylate groups are reported in terms of the mole percent of each acid relative to the combined total of the carboxylic acids added during the esterification process, i-C5 is an industrial chemical product which is a mixture of about 34% 2-methylbutanoic acid and 66% n-pentanoic acid, i.e., isopentanoic acid (The Dow Chemical Company), and i-C9 represents the carboxylates derived from 3,5,5-trimethylhexanoic acid, e.g., isononanoic acid (Oxea Corporation).

TABLE L1

| Lubricant | ISO Grade | Polyol | Branched Acid Mole % | Approx. Mole % Carboxylate | | | |
|---|---|---|---|---|---|---|---|
| | | | | n-$C_5$ | i-$C_5$ | n-$C_7$ | i-$C_9$ |
| Comp A | 32 | DiPE/TechPE | 15 | 44 | — | 41 | 15 |
| Comp B | 32 | TechPE | 28 | 72 | — | — | 28 |
| Comp C | 68 | DiPE/MonoPE | 47 | 20 | — | 33 | 47 |
| Inv 1 | 46 | PolyPE | 43 | — | 85 | 1 | 14 |
| Inv 2 | 68 | PolyPE | 37 | — | 94 | 1 | 5 |

Lubricant Properties

Table L2 shows the failure load as determined by ASTM D 3233 Failure Load (Method A), (lbs. force at pin failure) using the Falex Pin and Vee Block test, and the coefficient of friction (C of F) as a function of entrainment speed at 40° C. as determined using the Mini Traction Machine. The higher the reported failure load, the better the lubricant is predicted to prevent wear; a lower C of F correlates with better lubricity and less frictional energy losses.

TABLE L2

| Lubricant | Failure Load lbs. force at pin failure | C of F @ 40° C. | |
|---|---|---|---|
| | | 30 mm/s | 300 mm/s |
| Comp A | 950 | 0.57 | 0.45 |
| Comp B | 875 | 0.66 | 0.56 |
| Comp C | 745 | — | — |
| Inv 1 | 883 | — | — |
| Inv 2 | 890 | 0.57 | 0.48 |

Working Fluids

R-410A is a refrigerant blend comprising a 50:50 wt ratio of two hydrofluoro alkanes, R-32 and R-125

L-41b is a low GWP refrigerant blend comprising a 73:27 wt ratio of hydrofluoro alkane R-32 to hydrofluoro olefin R-1234ze.

A working fluid comprising the lubricant of Comp A with the refrigerant R-410A is a commercially used, state of the art pairing of lubricant and refrigerant used for example in home air conditioners.

Miscibility of Refrigerant/Lubricant Combinations

Table WF 1 lists the temperatures showing the boundaries at which the designated concentration of lubricant in the refrigerant separates as determined by using industry standard methods.

TABLE WF 1

| Test Fluid | ISO Grade | Low End Misc Limit (° C.) @ % Oil | | | | High End Misc Limit (° C.) @ % Oil | | | |
|---|---|---|---|---|---|---|---|---|---|
| | | 5% | 10% | 20% | 30% | 5% | 10% | 20% | 30% |
| Comp A R-410A | 32 | −40 | −26 | −22 | −22 | 57 | 49 | 48 | 48 |
| Comp A L-41b | 32 | −30 | −21 | −15 | −20 | >73 | 71 | 69 | 72 |
| Comp B L-41b | 32 | <−62 | −60 | −57 | −50 | >72 | >72 | >72 | >72 |
| Comp C L-41b | 68 | −20 | −8 | 5 | 4 | 68 | 60 | 52 | 55 |
| Inv 1 L-41b | 46 | <−64 | −50 | −45 | −49 | >73 | >73 | >73 | >73 |
| Inv 2 L-41b | 68 | −35 | −25 | −9 | −23 | 61 | 60 | 66 | >71 |

Heat Transfer Capacity and Efficiency

The working fluids of the invention were evaluated for use in heat transfer devices using full system testing under AHRI Standard 210/240 conditions. Two independent energy balances were used for calculating capacity: (1) air-side energy balance and (2) refrigerant-side energy balance. Combining measurements of air flow rate, temperature, and humidity change allowed the calculation of capacity from measurements. The change in specific enthalpy from component inlet to outlet was determined from temperature and pressure measurements.

In running the tests, polyol ester lubricants and refrigerants were charged to the system per industry standard procedures until the sub-cooling matched that specified by the manufacturer. The system was run for several hours while the proper test conditions were achieved. Following 30 minutes at steady state, data were collected for 30 minutes per test condition and the equilibration-testing cycle was repeated for each AHRI test condition. After completing data collection for a refrigerant-lubricant pair, the system was thoroughly flushed to remove any residual working fluid from all components. Then it was evacuated to 75 mTorr and the next lubricant-refrigerant pair was charged.

COP measures system efficiency by relating cooling capacity to the power requirements of the system. Power to the outdoor unit was consumed by the compressor and a blower. Power to the indoor unit was used by a fan and 24 Volt transformer. Each unit's power requirements were measured separately by calibrated transducers. COP was calculated using standard techniques.

Selection of the proper lubricant of the present invention can lead to efficiency improvements of up to ~12% depending on the refrigerant.

Working Fluid Viscosity

The test fluids were tested under conditions representing those found within the compressor of a refrigeration or air conditioning unit according to standard protocols. When operating the system in cooling mode under the AHRI standard conditions A, B, and C, the temperature and pressure conditions inside the compressor were measured and are listed below. Therefore, the viscosity of the working fluid at these temperatures and pressures is relevant to evaluating the performance of the inventive lubricants.

| AHRI Cond | Compressor Inlet | | Compressor Outlet | |
|---|---|---|---|---|
| For Fluids w Refrigerant L-41b | Temp (° C.) | Pressure (bar) | Temp (° C.) | Pressure (bar) |
| A | 23.3 | 8.9 | 94.5 | 26.4 |
| B | 21.1 | 8.8 | 79.9 | 22.0 |
| C | 18.5 | 7.8 | 82.2 | 21.4 |

Table WF 2 shows the viscosity and amount of dissolved refrigerant for the Test Fluids under the conditions designated.

TABLE WF 2

| Test Fluid | ISO Grade | Working Fluid Viscosity (cSt) @ AHRI Cond | | | Dissolved Refrigerant (wt %) @ AHRI Cond | | |
|---|---|---|---|---|---|---|---|
| | | A | B | C | A | B | C |
| Comp A R-410a | 32 | 6.1 | 7.3 | 7.4 | 5.5 | 6.9 | 5.6 |
| Comp A L-41b | 32 | 4.4 | 5.7 | 5.7 | 4.0 | 4.8 | 4.1 |
| Comp B L-41b | 32 | 4.1 | 5.3 | 5.3 | 3.9 | 4.7 | 4.0 |
| Comp C L-41b | 68 | 7.2 | 9.7 | 9.7 | 3.3 | 3.9 | 3.4 |
| Inv 1 L-41b | 46 | 5.4 | 7.1 | 7.1 | 3.6 | 4.4 | 3.7 |
| Inv 2 L-41b | 68 | 7.0 | 9.2 | 9.3 | 3.8 | 4.6 | 3.9 |

Of the fluids containing L-41 b, those comprising the inventive lubricant Inv 2 and comparative lubricant Comp C displayed working viscosities equal to or higher than those found for the commercial pairing of Comp A with R-410A under each test condition. Inventive lubricant Inv 1 produced a composition with L-41 b having an acceptable viscosity under conditions B and C.

What is claimed:

1. A working fluid comprising:
   i) a refrigerant blend comprising from 80 to 60% by weight, based on the weight of the refrigerant blend, of fluorinated alkane, from 20 to 40% by weight of a fluorinated olefin, and less than 5 wt % of other refrigerants are present, and
   ii) a polyol ester lubricant composition having a kinematic viscosity at 40° C. of from 32 to 120 cSt and a kinematic viscosity at 100° C. of from 5 to 20 cSt, comprising:
      a) from about 30 to about 85 wt % $C_{5-10}$ alkylcarboxy esters of pentaerythritol,
      b) from about 1 to about 20 wt % $C_{5-10}$ alkylcarboxy esters of di-pentaerythritol,
      c) from about 1 to about 10 wt % $C_{5-10}$ alkylcarboxy esters of tri-pentaerythritol, and
      d) from about 10 to about 45 wt % $C_{5-10}$ alkylcarboxy esters of pentaerythritol oligomers of 4 or more pentaerythritol monomer groups, based on the weight of all polyol esters in the lubricant, and wherein 60 mole % or more of all the $C_{5-10}$ alkylcarboxy esters are linear or branched $C_5$ alkylcarboxy esters, and 25 to 55% of the $C_{5-10}$ alkylcarboxy esters are branched.

2. The working fluid according to claim 1 wherein the polyol ester lubricant composition has a kinematic viscosity at 40° C. of from 40 to 140 cSt.

3. The working fluid according to claim 1 wherein the polyol ester lubricant composition comprises:
   a) from about 30 to about 55 wt % $C_{5-10}$ alkylcarboxy esters of pentaerythritol,
   b) from about 1 to about 20 wt % $C_{5-10}$ alkylcarboxy esters of di-pentaerythritol,
   c) from about 1 to about 10 wt % $C_{5-10}$ alkylcarboxy esters of tri pentaerythritol, and
   d) from about 25 to about 45 wt % $C_{5-10}$ alkylcarboxy esters of pentaerythritol oligomers of 4 or more pentaerythritol monomer groups.

4. The working fluid according to claim 1 wherein 75 mol % or more of all alkylcarboxy esters are linear or branched $C_5$ alkylcarboxy esters.

5. The working fluid according to claim 1 wherein 30 to 50 of the $C_{5-10}$ alkylcarboxy esters are branched.

6. The working fluid according to claim 1 wherein the refrigerant blend comprises from 70 to 75% by weight of fluorinated alkane and from 25 to 30% by weight of a fluorinated olefin hydrofluorocarbon refrigerant.

7. The working fluid according to claim 1 wherein the refrigerant blend comprises a hydrofluoro alkane and a hydrofluoro olefin, which a hydrofluoro olefin has 3, 4 or 5 carbon atoms.

8. The working fluid according to claim 7 wherein the hydrofluoro alkane comprises difluoromethane (R-32), 1,1,1,2-tetrafluoroethane (R-134a), 1,1,2,2-tetrafluoroethane (R-134), pentafluoroethane (R-125), or 1,1,1-trifluoroethane (R-143a).

9. The working fluid according to claim 8 wherein the hydrofluoro olefin comprises a polyfluorinated propene.

10. The working fluid according to claim 7 wherein the hydrofluoro olefin comprises a polyfluorinated propene.

11. The working fluid according to claim 1 wherein the refrigerant consists of a mixture of the fluorinated-olefin and the fluorinated alkane.

* * * * *